United States Patent [19]

Neuroth

[11] 4,085,521
[45] Apr. 25, 1978

[54] AIR-STEAM INTERFACE IN CONTINUOUS VULCANIZATION PROCESS FOR ALLOWING ACCURATE OPTICAL MEASUREMENTS

[75] Inventor: David H. Neuroth, Theresa, N.Y.

[73] Assignee: Harvey Hubbell Incorporated, Orange, Conn.

[21] Appl. No.: 731,220

[22] Filed: Oct. 12, 1976

[51] Int. Cl.² .............................................. F26B 19/00
[52] U.S. Cl. .......................................... 34/89; 34/15; 34/242; 73/323; 73/49.3; 73/49.8
[58] Field of Search ........................ 34/89, 90, 242, 15; 68/5 E; 137/559; 73/323, 49.3, 49.8, 37.5; 222/154, 156, 159, 190

[56] References Cited
U.S. PATENT DOCUMENTS

| 3,323,484 | 6/1967 | Minkin et al. | 73/323 |
| 3,759,662 | 9/1973 | Bengel | 34/242 |
| 4,017,258 | 4/1977 | Sando et al. | 34/242 |

Primary Examiner—Kenneth W. Sprague
Assistant Examiner—James C. Yeung
Attorney, Agent, or Firm—Oblon, Fisher, Spivak, McClelland & Maier

[57] ABSTRACT

A novel process and apparatus are disclosed which permit an air-stream interface to be maintained in a continuous vulcanization cable production process in order to enable accurate optical measurements of the cable to be taken at all times. Specifically, a baffle assembly is provided in conjunction with a high pressure, high temperature steam supply and a high pressure air supply to maintain a clear air region in a steam vulcanization chamber. The baffle assembly together with interconnected air and steam supply lines and an exhaust line provides a flow pattern which permits an optical window within the clear air region to be maintained in a clear and unobstructed state so that optical measurements can be continuously conducted while the vulcanization process is in operation.

7 Claims, 3 Drawing Figures

AIR-STEAM INTERFACE IN CONTINUOUS VULCANIZATION PROCESS FOR ALLOWING ACCURATE OPTICAL MEASUREMENTS

BACKGROUND OF THE INVENTION

1. Field of the Invention

The present invention relates generally to an arrangement for maintaining a clear air zone in a high pressure, high temperature steam vulcanization process, and more particularly to a method and apparatus for maintaining a clear air zone for permitting optical measurements in a high pressure, high temperature steam continuous vulcanization chamber.

2. Description of the Prior Art:

In the cable manufacturing industry one of the critical requirements is that the cable being produced is of the proper size. Unfortunately, accurate sizing measurements are particularly complicated when cable is being prepared according to conventional continuous vulcanization processes. In such processes the cable, with an appropriate layer of unvulcanized insulation, is produced in an extruding machine, and is subsequently fed into a tubular continuous vulcanization chamber of perhaps 400 to 500 ft. in length filled with high pressure, high temperature steam. The insulation material coating the cable is vulcanized as the extruded cable passes through this long vulcanization chamber.

A problem that exists in this environment is that of measuring the cable size during the vulcanization process. In the past, measurements of cable size have been conducted with sizing dies as the cable emerges from the long vulcanization tube. This measuring technique is very inefficient, however, because if the cable is found to be off size, a minimum of 400 ft. (i.e. the length of the vulcanization chamber) of scrap cable must be manufactured before appropriate changes can be made in the extruding process to try to bring the cable to size. Another 400 ft. of cable must then be produced before the effect of these changes can be evaluated. Furthermore, it may take as long as one hour for the cable to emerge from the vulcanization tube, causing significant delay times in adjustment of the extruding operation not to mention costly material losses when off-size cable is being produced. Thus simply waiting until the cable emerges from the end of the vulcanization tube results in a very costly and inefficient technique of monitoring cable size.

Ideally, the size of a cable should be measured as soon as it emerges from the extruding machines and enters the vulcanization tube. However, the high pressure and high temperature existing in the vulcanization tube makes direct access to the tube totally impractical since the vulcanization tube must remain sealed to prevent the steam contained in it from escaping. Optical measurements of the cable through a sealed optical window using a device such as a laser micrometer would appear in theory to provide a solution to the problem of accurately measuring cable diameters. Unfortunately, this solution has not worked satisfactorily in the past because; first, it has been found to be virtually impossible to maintain an optical window into to the vulcanization tube free of condensation which tends to diffuse light, thereby rendering optical measurements unreliable and, second, condensation of steam on the cable itself causes water droplets which interfere with accurate optical measurement of the cable. It is accordingly understood by those skilled in the art that if an optical window could be maintained in a clear and transparent state in the continuous vulcanization system, and if the cable could be kept free of condensation droplets, cable size monitoring techniques could be made highly efficient by the use of laser micrometers at the point where cable emerges from the extruding machine. Such a system, depending upon the maintenance of a clear optical window and a clean cable, would minimize product wastage and at the same time minimize time lost in modifying the extruding process to correct for errors in the dimension of the extruded cable.

SUMMARY OF THE INVENTION

Accordingly, one object of the present invention is the provision of a novel technique for maintaining a clear optical window in a vulcanization chamber.

A further object of the present invention is the provision of a novel apparatus for maintaining a clear air zone in a continuous vulcanization chamber for the purpose of maintaining a clear optical window therein.

Yet another object of the present invention is to prevent water droplets due to condensation from accumulating on at least a limited region of an extruded cable.

Yet another object of the present invention is the provision of a novel method for maintaining a clear optical window in a continuous vulcanization chamber.

Yet another object of the present invention is the provision of a novel apparatus for creating a fluid flow pattern which results in a clear air zone being maintained adjacent to a high pressure, high temperature steam zone.

Yet another object of the present invention is the provision of a novel baffle structure for use in isolating a clear air zone from a high temperature, high pressure steam zone.

Briefly, these and other objects of the invention are attained by the provision of a novel baffle assembly and fluid flow arrangement in a continuous vulcanization tube. The baffle assembly includes a pair of flexible baffle elements having adjustable slits cut at the center portions thereof so that a cable element can force its way through the slits. An optical viewing window is provided in a chamber at one side of the baffle assembly and an air supply is provided to this chamber, while a high pressure, high temperature steam environment exists at the opposite side of the baffle assembly. A leakage flow is maintained from the separated steam and air regions into a region between the baffle elements so as to provide a buffer zone for maintaining complete isolation of the air and steam zones, and an exhaust line is coupled to the buffer zone. Maintenance of a clear air zone in the region of the optical window keeps the window clear from the purpose of making optical measurements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
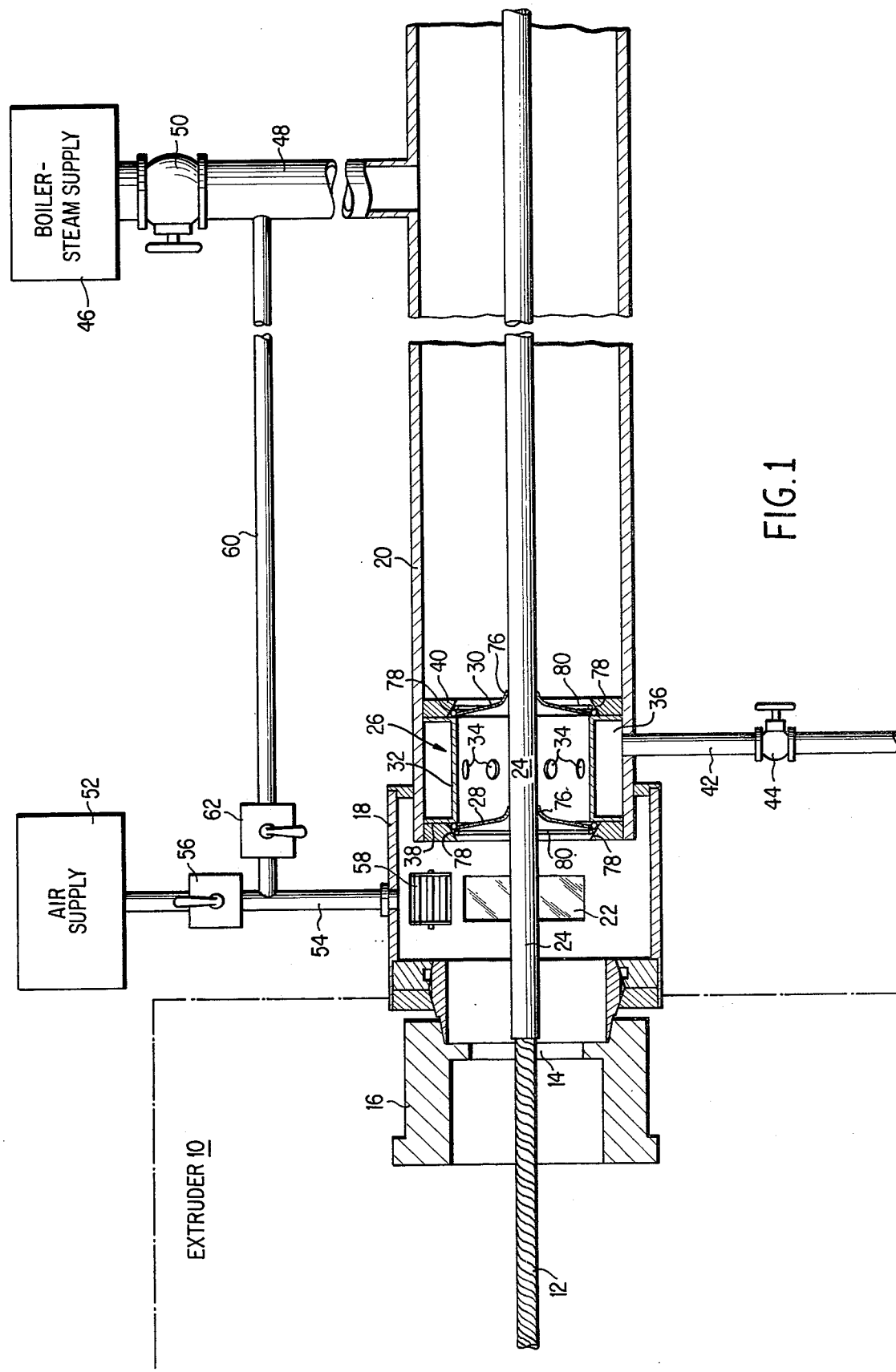
FIG. 1 is a partially schematic cutaway view showing the apparatus of the present invention in conjunction with a continuous vulcanizing cable production apparatus.

Referring now to the drawings, wherein like reference numerals designate identical or corresponding parts throughout the several views, and more particularly to FIG. 1 thereof, the overall configuration of the present invention is illustrated. The environment of the invention is shown as including a conventional extruding machine 10 shown in block form. As is well known to those skilled in the art of cable manufacturing, extruding machines are conventionally used for producing insulated cable products. In the extruding machine, a conductive core of copper, for example, is prepared for coating with an uncured insulating material such as a rubber compound. A conductor or other combination of materials over which one wishes to place a vulcanized layer forms a cable core 12, which enters and passes through the extruder 10 wherein it is coated with an unvulcanized layer of rubber or other material to form a composite 24. A sizing die 14 shapes the unvulcanized layer and is conventionally positioned in a die holder 16 which is secured to the output side of the extruding machine 10.

Conventionally, a continuous vulcanization tube is secured directly to the output side of the die holder 16 so that the extruded cable emerging from the sizing die immediately enters into the continuous vulcanizing chamber which contains a vulcanizing atmosphere consisting, for example, of steam at a pressure on the order of 250 PSI and corresponding temperature on the order of 405° F. The continuous vulcanization chamber is normally in the form of a tube which conventionally may be 400 to 500 ft. in length. The product emerging from the continuous vulcanization chamber is a finished cable with a fully vulcanized compound surrounding it. However, as mentioned previously, the problem existing in conventional systems of this type resides in the fact that sizing tolerances are critical in producing the cable, and accordingly the extruding machine 10 must be controlled to provide a properly dimensioned extruded cable product. However, due to the high pressure and high temperature existing in the continuous vulcanization chamber, it is not practical to mechanically measure the cable within the vulcanization tube, nor was it previously practical to obtain optical measurements of the cable due to the impossibility of preventing any optical window from fogging with steam condensation and due to the build up of condensation droplets on the cable itself. Accordingly, it was necessary to wait for cable to emerge from the end of the vulcanization tube before sizing tests could be conducted, a very wasteful and time consuming process.

The present invention circumvents these limitations of the prior art by providing an optical measurement housing 18 which is directly coupled in a fluid tight manner between the output of the extruding machine 10 and a continuous vulcanization tube 20. The optical measurement housing 18 is preferably constructed of heavy corrosion resistant steel and is securely fastened to both the die holder 16 and the continuous vulcanization tube 20 so as to contain without difficulty pressures of 250 PSI or more.

A viewing window 22 is provided in the optical measurement housing to permit optical measurements to be taken of the extruded cable 24 as soon as it emerges from the extruding machine 10. A conventional laser micrometer, for example, may be positioned outside of the optical measurement housing 18 adjacent the window 22 to continuously monitor the diameter of the extruded cable 24. The output of the micrometer may then be either visually observed to provide a basis for manually adjusting the output of the extruding machine, or a direct feedback loop can be provided between the laser micrometer and the extruding machine to maintain the extruded cable within desired dimensional limits.

As mentioned previously, maintaining the viewing window 22 free of condensed moisture or other obfuscating coatings is necessary in order to ensure the accuracy of the optical measuring system. It is also necessary to keep the cable free from condensation droplets which distort optical readings. This is achieved in accordance with the teachings of the present invention by providing a baffle assembly combined with fluid supply and exhaust lines which produce three discrete atmospheric regions within the continuous vulcanization tube 20.

More specifically, a buffer zone is created within the continuous vulcanization tube 20 by the insertion of a mixture tube extension 26 having baffle members 28 and 30 enclosing opposite ends thereof. The mixture tube extension 26 consists of a tubular wall member 32 having a plurality of exhaust apertures 34 (preferably six) evenly spaced around the periphery thereof. The diameter of the tubular wall member 30 is preferably somewhat less than that of the interior diameter of the continuous vulcanization tube 20 so that an annular exhaust space 36 in communication with the exhaust apertures 34 is formed around the outer periphery of the tubular wall member 32. This exhaust space 36 is limited at either end by end plates including baffle retaining rings 38 and 40 which are formed integral with or secured to opposite ends of the tubular wall member 32. The end plate and baffle retaining ring structures are larger in diameter than the tubular wall member 32, and preferably having a diameter which is substantially the same as the interior diameter of the continuous vulcanization tube 20 so that the continuous vulcanization tube is essentially closed at one end by the mixture tube extension and baffle structure. It will be apparent from the subsequent disclosure, however, that the mixture tube extension and baffle arrangement does not provide a pressure tight seal of the continuous vulcanization chamber, but permits a continuous "leak" flow into the interior of tubular member 32 and into the annular exhaust space 36.

An exhaust line 42 having a flow control valve 44 penetrates the wall of the continuous vulcanization tube 20 and communicates with the exhaust space 36.

A boiler or other suitable steam supply 46 is coupled by means of a steam delivery pipe 48, having a control valve 50 therein, to the continuous vulcanization chamber to supply the requisite high pressure, high temperature steam. As noted previously, the steam supplied to the continuous vulcanization chamber preferably has a pressure of at least 250 PSI and and associated saturated steam temperature of 450° F.

A high pressure air supply 52 is similarly connected to the interior of the optical measurement housing 18 by means of a line 54 having a control valve 56 therein.

The air supply 52 is set to deliver air at a pressure greater than the steam supply, that is in excess of 250 PSI (preferably 310 PSI). Valve 56 is adjusted to allow a continuous leak flow of air from the high pressure supply 52 into the optical measurement housing 18.

A deflector 58 is mounted within the optical measurement housing 18 so as to deflect at least a portion of the fluid flow from line 54 directly across the viewing window 22. The deflector 58 may, for example, consist of a slotted member or another suitable device whereby a substantial fraction of the fluid influx supplied through line 54 is deflected across the surface of the viewing window 22, while the remainder of the fluid influx is distributed within the optical measurement housing. A start-up line 60 having a shut-off valve 62 therein is connected between the steam delivery pipe 48 and the line 54 so that high pressure steam can selectively be delivered through the line 54 for application across the viewing window 22 to cleanse the window.

Figure 2:
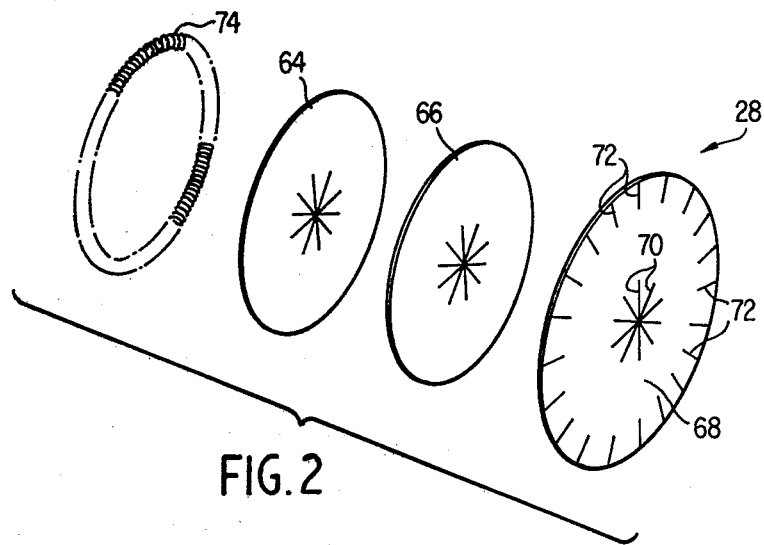
FIG. 2 is an exploded perspective illustration of the structure of the baffles according to the present invention.
Figure 3:
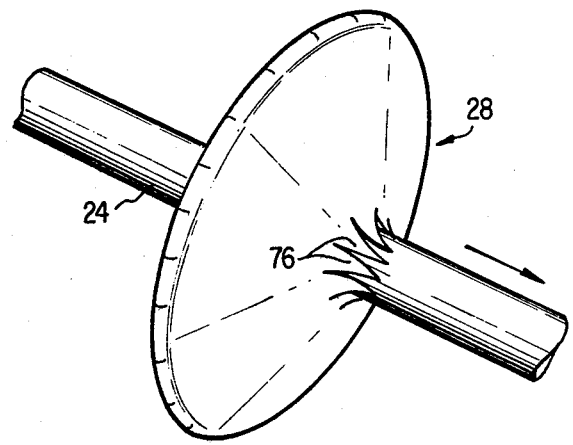
FIG. 3 is a perspective illustration showing the manner in which an extruded cable passes through the baffles of the present invention.

The structure of the baffle members 28 and 30 is illustrated in greater detail in FIGS. 2 and 3. Referring particularly to FIG. 2, the layered structure of the baffle 28 is shown, it being understood that the baffles 28 and 30 are of identical structure. Each baffle consists of three circular sheets 64, 66 and 68 formed of a material which is slippery, resilient, tear resistant and highly resistant to the deteriorating effects of high pressure, high temperature environments. Fiberglass cloth impregnated with Telfon, preferably having a thickness of 0.006 in. has been found ideal for this purpose. The circular sheets 64 and 66 are preferably of identical size, each having a diameter on the order of six inches, for example, depending upon the diameter of the continuous vulcanization tube 20 and the tubular wall member 32. The circular sheet 68 is cut somewhat larger than the other sheets, for example 10 inches in diameter. A plurality of X-cuts or slits 70 between one and three inches in length are made through the center portion of each of the circular sheets. The X-cuts are made such that each cut or slice in the material passes approximately through the center of each circular sheet, thereby providing an adjustable aperture through which the extruded cable can pass, as will be explained in more detail subsequently.

After the circular sheets 60 – 68 are cut at the center portion thereof, of, the largest sheet 68 is also provided with a series of edge cuts forming a plurality of tabs 72 spaced approximately evenly around the periphery thereof. The three circular sheets 64 – 68 are then assembled concentrically with their X-cuts rotated out of alignment. A coil spring member 74 formed into a circle is provided as a resilient framework to which the circular baffle members are attached. The assembled baffle members are positioned adjacent the coil spring member and the edge tabs 72 of the largest circular sheet 68 are bent over the perimeter of the coil spring member 74 and subsequently firmly stapled together so as to secure the three circular sheet members 64 – 68 together and simultaneously secure the three circular sheet members to the circular coil spring support.

As shown in FIG. 3, the extruded cable 24 passes through the center portion of the baffle 28 (and similarly the baffle 30) by displacing the X-cut portion 76 at the center of each baffle member. The X-cut portion of each baffle is displaced just a sufficient amount to enable the cable 24 to pass through, and due to the resiliency of the fabric of which the baffle members are formed, the opening in the X-cut portion 76 will adjust to the size of the cable passing through it. However, due to the nature of the X-cut structure, no tight seal is formed between the extruded cable and the baffle, but instead small apertures exist all around the cable as it passes through each baffle. These small apertures provide for a forward "leak" flow into the buffer zone in the mixture tube extension 26.

The baffles 28 and 30 are secured in place by snapping the coil spring members 74 into suitable grooves within the baffle retaining rings 38 and 40. Specifically, each of the baffle retaining rings includes an annular sloped surface 78 forming an annular V-shaped groove adjacent each end of the mixture tube extension 26. The diameter of these V-shaped grooves is slightly less than the diameter of the coil spring members secured within each of the baffles 28 and 30. Thus, as each baffle is pressed into place, the coil spring member 74 is compressed slightly, resulting in a firm interference fit within the walls of the V-shaped grooves.

Locking rings 80, formed of spring steel wire, or another suitably resilient material may also be formed of the proper diameter and positioned adjacent the coil spring members 74 in each of the V-shaped retaining grooves to further secure the baffle members in place and to prevent their being dislodged by the passage of the extruded cable through them.

The operation of the present invention will now be described in more detail. Initially, the baffle members are fitted into place to form the baffle chamber structure illustrated in FIG. 1. The continuous vulcanization tube and the optical measurement housing are then sealed in preparation for the admission of the high pressure, high temperature vulcanizing steam into the apparatus.

Initially, as extruded cable first emerges from the extruding machine 10, it is very hot and emits oil-like vapors and fumes which may obscure the viewing window 22. Accordingly, the valve 62 and the startup line 60 is initially opened to permit the high temperature vulcanization steam to be injected into the measurement housing 18 through the line 54, and to be deflected across the viewing window 22 by the deflector 58. This causes an initial washing or cleansing of the window as the extruding process is begun to remove any oil films from the window. The control valve 50 is of course, open to maintain the proper hot steam vulcanizing atmosphere throughout the interior of the continuous vulcanization tube 20.

The shut-off valve 62 is closed after the viewing window 22 is cleansed and the control valve 56 is partially opened to permit a flow of high pressure air from the supply 52 to flow into the measurement housing 18 and across the viewing window 22. The air supply quickly evaporates any steam condensed on the viewing window and also absorbs residual steam from the confines of the measurement housing.

The flow control valve 44 in the exhaust line 42 is opened so that the exhaust line couples the annular exhaust space 36 to an environment which is at a lower pressure than that which exists within the measurement housing 18 and the continuous vulcanization tube 20. Accordingly, a net outflow of fluid occurs through the exhaust line 42. As mentioned previously, the X-cut center portions of the baffles do not provide an air-tight seal around the extruded cable 24, and thus leakage exists around the cable through both baffles 28 and 30. Specifically, high pressure air leaks through the baffle 28 and high pressure steam leaks through the baffle 30 to form an air-steam admixture within the buffer zone between the two baffles. This mixture of fluids flows uniformly out through the exhaust apertures 34, which are spaced uniformly around the periphery of the tubular wall member 32 to prevent a directional exhaust flow across the extruded cable, thereby preventing the exhaust flow from in any way effecting the hot extruded cable 24. The mixed air and steam enter the annular exhaust space 36 and flow off through the exhaust line 42.

The presence of the baffles 28 and 30 separates the steam environment existing within the continuous vulcanization tube 20 from the clear air environment existing within the measurement housing 18 and accordingly prevents direct intermingling of these two atmospheric mediums. The air and the steam supplies are maintained in dynamic pressure equilibrium so that the leakage flow into the buffer zone between the two baffles 28 and 30 occurs at a controlled rate. The exhaust flow is similarly adjusted so that only a modest pressure differential exists across the baffles whereby the baffles are not subjected to excessive forces, although a sufficiently rapid exhaust flow occurs from the buffer zone so as to prevent this region from becoming dominated by either the air or steam influx into it.

Accordingly, it will be apparent that the present invention provides a technique and an apparatus for maintaining an optically clear air zone and a clear viewing window within a high pressure, high temperature steam vulcanization process.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for permitting unobscured observation of a product being treated in a high temperature, high pressure atmosphere, comprising:
   chamber means for containing said high temperature, high pressure atmosphere,
   baffle assembly means for defining a buffer region substantially closing one end of said chamber means,
   observation housing means including an observation window coupled to said baffle assembly so that said buffer region is positioned between said observation housing means and said chamber means; and
   fluid flow means coupled to said chamber means, said baffle assembly means and to said observation housing means for establishing a leakage flow from said chamber means and from said observation housing means into said buffer region whereby said high temperature, high pressure atmosphere is prevented from influencing conditions within said observation housing means, said fluid flow control means comprising,
   a high pressure air supply,
   an air line coupling said air supply to said observation housing means for establishing a high pressure air atmosphere within said observation housing means,
   a high pressure, high temperature steam supply,
   a steam line coupling said steam supply to said chamber means for establishing said high pressure, high temperature atmosphere therein,
   slits in said baffle assembly means for allowing leakage of steam and air into said buffer region,
   an exhaust line coupled to said buffer region for removing steam and air therefrom; and
   a start-up line coupled between said steam line and said air line for allowing steam to be selectively introduced into said observation housing means.

2. An apparatus as in claim 1, further comprising:
   deflection means mounted within said observation housing for deflecting fluid supplied through said air line across said observation window to maintain said window in a clear condition.

3. An apparatus for permitting unobscured observation of a product being treated in a high temperature, high pressure atmosphere, comprising:
   chamber means for containing said high temperature, high pressure atmosphere,
   baffle assembly means for defining a buffer region substantially closing one end of said chamber means,
   observation housing means including an observation window coupled to said baffle assembly so that said buffer region is positioned between said observation housing means and said chamber means,
   fluid flow means coupled to said chamber means, said baffle assembly means and to said observation housing means for establishing a leakage flow from said chamber means and from said observation housing means into said buffer region whereby said high temperature, high pressure atmosphere is prevented from influencing conditions within said observation housing means,
   said baffle assembly means comprising,
   a baffle support member and baffle member secured at each end of said baffle support member,
   each said baffle member including apertures for permitting leakage flow into said buffer region,
   said baffle support member comprising a tubular member having two end surfaces and a plurality of exhaust ports spaced around the periphery thereof; and,
   baffle mounting means adjacent the end surfaces of said tubular member and at least partially defining an exhaust chamber around the periphery of said tubular member.

4. An apparatus for permitting unobscured observation of a product being treated in a high temperature, high pressure atmosphere, comprising:
   chamber means for containing said high temperature, high pressure atmosphere,
   baffle assembly means for defining a buffer region substantially closing one end of said chamber means,
   observation housing means including an observation window coupled to said baffle assembly so that said buffer region is positioned between said observation housing means and said chamber means,
   fluid flow means coupled to said chamber means, said baffle assembly means and to said observation housing means for establishing a leakage flow from said chamber means and from said observation housing means into said buffer region whereby said high temperature, high pressure atmosphere is prevented from influencing conditions within said observation housing means, said baffle assembly means comprising,
   a baffle support member and baffle members secured at each end of said baffle support member and being formed by generally circular sheets of resilient, tear resistant material having slits cut through the center portions thereof for creating an opening of adjustable size, each said baffle member including apertures for permitting leakage flow into said buffer region.

5. An apparatus as in claim 4, wherein said baffle members further comprise:
   a plurality of layers of said material; and,
   a circular coil spring member to which said plurality of layers of material are secured.

6. A method of maintaining a clear atmosphere in an observation chamber adjacent to a continuous vulcanization chamber adjacent to a continuous vulcanization chamber filled with high temperature, high pressure steam, comprising the steps of:
   separating said observation chamber and said continuous vulcanization chamber with a buffer zone,
   supplying clear air to said observation chamber and high temperature steam to said continuous vulcanization chamber at substantially the same pressure,
   permitting a leakage flow of air from said observation chamber and a leakage flow of steam from said continuous vulcanization chamber into said buffer zone,
   exhausting the steam-air mixture formed in said buffer zone, providing a window in said observation chamber; and,
   supplying high temperature steam to said observation chamber for cleansing said window.

7. A method of maintaining a clear atmosphere in an observation chamber adjacent to a continuous vulcanization chamber filled with high temperature, high pressure steam, comprising the steps of:
   separating said observation chamber and said continuous vulcanization chamber with a buffer zone by forming baffle members of a suitable resilient fabric material and slicing the central portion of said baffle members to provide numerous X-cuts which define an adjustable aperture and permit said leakage flow,
   assembling said baffle members with a suitable support to form said buffer zone,
   supplying clear air to said observation chamber and high temperature steam to said continuous vulcanization chamber at substantially the same pressure,
   permitting a leakage flow of air from said observation chamber and a leakage flow of steam from said continuous vulcanization chamber into said buffer zone; and,
   exhausting the steam-air mixture formed in said buffer zone.

* * * * *